Patented Dec. 30, 1930

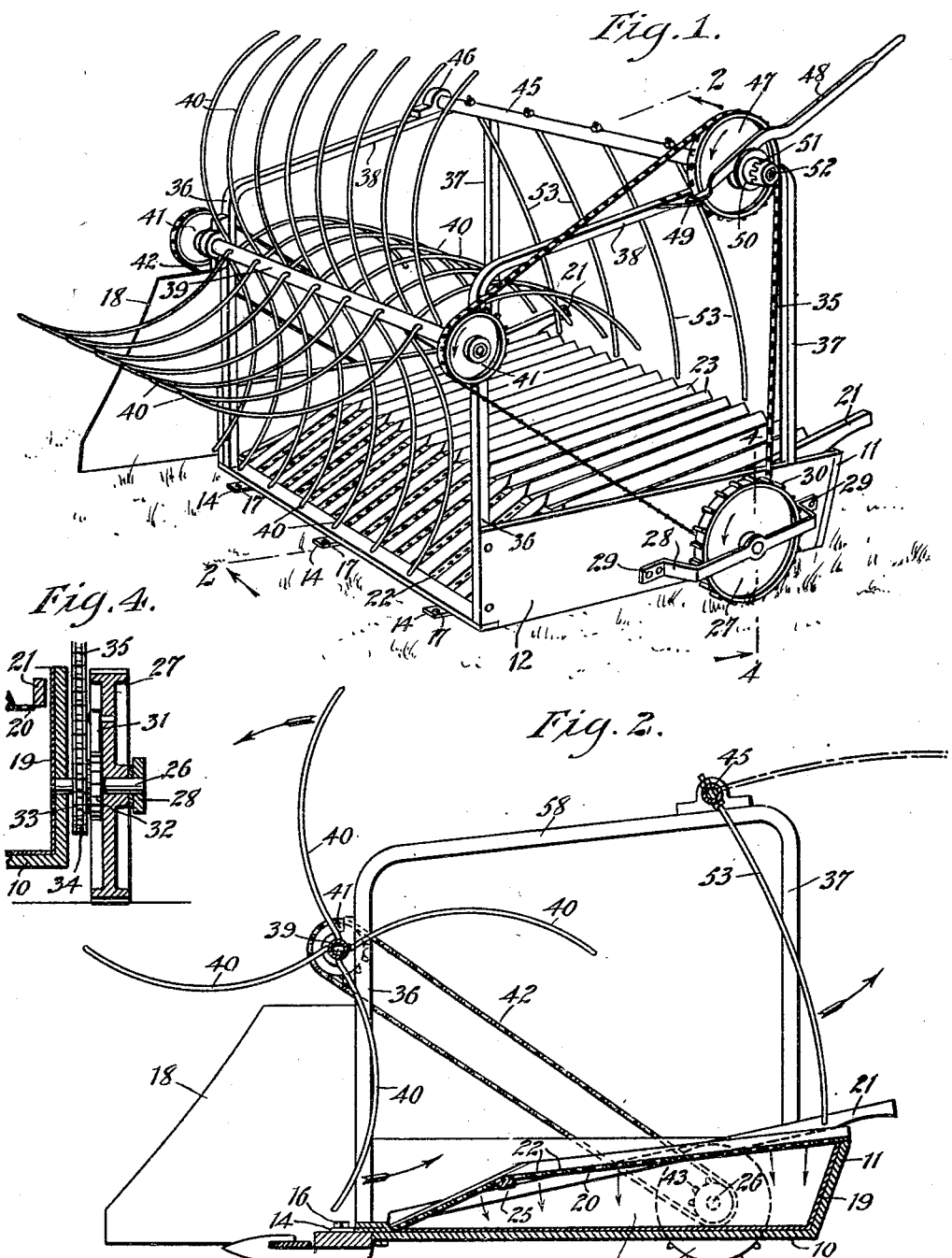

1,786,487

UNITED STATES PATENT OFFICE

RITCHARD W. GEORGE, OF KELSO, TENNESSEE

MOWER ATTACHMENT

Application filed August 10, 1928. Serial No. 298,719.

The invention relates to attachments for mowing machines. The invention is particularly adapted for use in connection with harvesting grass, hay, grain and the like, and may be especially useful in connection with the gathering of short grasses such as clover. It is one object of the present invention to provide novel and improved means for preventing the loss of the seed of such grasses by harvesting.

Another object of the invention is to provide improved means for collecting the material harvested and discharging it from the apparatus at predetermined times, thus forming windrows, whereby breaking of the material is unnecessary.

Another object of the invention is to provide improved means for collecting the crop on to the device, and at the same time slightly tedding the grass.

A further object is to provide a simple inexpensive attachment adapted to be positioned upon the sickle bar of the mowing machine, and which is adapted to operate upon its own power generated by contact of its wheels with the ground, rather than derive power from the mowing machine to which it is adapted to be attached.

Numerous other objects and advantages will be apparent from the following specification taken in connection with the drawings, in which—

Fig. 1 is a perspective view of my invention unattached.

Fig. 2 is a sectional view taken as indicated by the dotted lines 2—2 of Fig. 1.

Fig. 3 is a detail view of a portion of the riddle pan.

Fig. 4 is a sectional view taken on lines 4—4 of Fig. 1.

Referring more particularly to the drawings, there is provided a base 10 having an upwardly extending rear wall 11 and side walls 12. The front edge of the base 10 is provided with a plurality of extending apertured connecting lugs 14, which, by referring to Fig. 2, may be seen to be attachable to the sickle bar of a mowing machine indicated at 15; readily detachable connection being made with the sickle bar by bolts 16 through the apertures 17 of the lugs 14.

It will be understood that the device is arranged to be positioned to the right of the mowing machine. If necessary, the usual finger bar of the mowing machine may be removed and a guide piece or finger bar 18 associated with the apparatus may be used instead.

Positioned upon the base 10 and within the side walls 12 a removable receptacle 19 is provided which is adapted to receive grain seeds which are detached from the plant in the course of the harvesting, as will hereinafter be described. Resting upon the rear wall 11 and sloping towards the cutter bar 15, an apertured riddle pan 20 is provided, the side edges of which are provided with handles 21, by means of which the pan may readily be removed from the apparatus. Apertures 22 are provided in the riddle pan; one preferred formation of which is illustrated in Fig. 3, in which a plurality of V-shaped upstanding rows 23 are provided spaced apart by depressions 24 within which the apertures 22 are positioned.

Approximately two-thirds of the way from the rear wall 11, the riddle pan 20 is angularly bent as at 25, and the angular relation of the remaining portion thereof with respect to the base 10 is greater than the rear portion of the pan 20. The forward part of the riddle pan between the point 25 and the cutter bar 15 is preferably flat as indicated in Fig. 1; the ridges 23 being confined to the rear portion of the pan. It may be readily seen that the riddle pan 20 may be readily removed from the device upon manipulation of the handles 21, the receptacle 19 may then be removed, and the seeds collected therein suitably deposited, and the receptacle 19 and riddle 20 may then be replaced and the harvesting proceeded with. Mounted upon the sides 12, stub axles 26 are provided, upon the extremities of which a pair of ground engaging wheels 27 are mounted. For supporting the ends of the axles 26 brackets 28 are provided secured as at 29 to the sides 12. The ground engaging wheels 27 are preferably provided with the customary webs 30 for insuring proper tread with the field over which they pass.

Referring to Fig. 4, it will be noted that the inner wheel of the device is loosely mounted upon the axle 26, and is provided with a pawl 31 which is adapted to engage a gear 32 having a bevelled ratchet 33 and a chain-engaging surface 34. The gear 32 is preferably freely mounted upon the axle 26. Movement of the harvester forwardly, turns the inner wheel of the wheels 27 in a counterclockwise direction as indicated by the arrow in Fig. 1. The pawl 31 is adapted to engage the ratchets 32 of the gear 33 and turn it with the wheel, thus turning the chain 35 which is adapted to pass over the teeth 34 of the gear 33. Supported from the four corners of a base 10, front and rear uprights 36 and 37 respectively are provided. As indicated, each pair of the uprights 36 and 37 are preferably formed of a single piece of angularly bent material; being arranged to provide a horizontal top connecting bar 38.

Mounted upon the uprights 36 there is provided a transversely extending rotary shaft 39 which is adapted to carry a plurality of rows of pushing or tedding fingers 40. The opposite ends of the shaft 39 are provided with driving gears 41, the inner one of which is adapted to be actuated by movement of the chain 35 associated with the gear 33 moved by movement of the inner wheel 27 of the harvester. It will be noted that a counter clockwise movement is thus imparted to the member 39. The opposite driving gear 41 is adapted to be actuated by a chain 42, which, by referring to Fig. 2, is driven by a gear 43 carried by, and rotatable with the outer ground-engaging wheel 27. It will be readily seen that when the device is turning or backing up, or at such times as there occurs variation in the revolving speed of the wheels 27, the outer wheel governs the rotational speed of the shaft 39. Reverse movement of the inner wheel 27 causes the pawl 31 to slip over the ratchet device 32 without engagement therewith. Upon forward movement of both wheels however, the ratchet 31 engages the teeth 32 and assists by movement of the chain 35 in turning the shaft 39. It may be readily seen that as the shaft 39 is turned in a counter clockwise direction while the harvester is travelling with the cutter bar 15, that the fingers 40 push the short grain up over the front inclined surface of the riddle pan 20, and on to the less tilting rear portion thereof; the effect being to aerate or ted the grain, and at the same time pushing the grain on to the rear portion of the riddle pan. It will be understood of course, that such seeds as are shaken from the grass in this act fall through the apertures 22 of the riddle pan 20 and are received within the receptacle 19.

Secured upon the horizontal portions 38 of the upright members there is provided a second rotary shaft 45 which is journalled at its outer end in a suitable journal box 46, the inner end of which is extended over the inner horizontal piece 38, and is provided with a chain-engaging gear 47 loosely mounted thereon. As illustrated, the chain engaging gear 47 receives over it, and is actuated by the chain 35. Associated with the inner horizontal member 38, a clutch lever 48 is provided pivoted thereto as at 49, and is adapted to pass over and engage a clutch member 50 provided with teeth 51 adapted to engage complementary teeth carried by a complementary clutch member 52 rigidly mounted upon the shaft 45. It will be understood that as the clutch lever 48 is moved to cause engagement of the teeth 51, that the rotary member 45 will be moved by and with the inner wheel 27, the speed of revolution of the shaft 45 being determined by the size of the actuating wheel 47. It will also be understood that by leaving the clutch lever 48 in the engaged position as illustrated in Fig. 1, that the rotary member 45 will revolve with a predetermined speed in a counter-clockwise direction. A plurality of fingers 53 are carried by the rotary member 45 and are adapted to swing around and into the dotted line position of Fig. 2, whereby the continued movement of the fingers 40 will thus push the harvested material off of the riddle pan 20 and deposit it upon the field. Continued revolution of the rotary member 45 will however, again bring fingers 53 into the full line position of Figs. 1 and 2, and thus hold the material upon the riddle pan until its further movement again releases it. The size of the gear wheels, that is, the chain driven wheels 47, 41, and the chain driving wheel 33 may be such that a complete revolution of the member 45 may occur at predetermined times, such as each twenty feet of travel of the device; thus wind-rows will be automatically formed each twenty feet of travel of the mechanism.

If desired, the clutch lever 48 may be moved to engage a clutch and revolve the member 45 at any desired point in travel, or it may be released for settling the movement of the rotary member 45 to conform with movement of the rotary member 39.

It will be understood that numerous changes and modifications of the various structural features of the invention may be resorted to without departing from the spirit or scope of the present invention, or the scope of the appended claims.

I claim:

1. An attachment for mowing machines including a removable seed receptacle, a rearwardly extending riddle, means for pushing the harvested crop upon said riddle, and separate means for causing the discharge of said crop rearwardly from said riddle.

2. An attachment for mowing machines including a removable seed receptacle, a rearwardly extending riddle, means for pushing the harvested crop upon said riddle, and separate means for causing the discharge of said crop rearwardly from said riddle, said last-mentioned means being automatically operable at predetermined points in the travel of said attachment.

3. An attachment for mowing machines, including a removable seed receptacle, a rearwardly extending riddle, means for pushing the harvested crop upon said riddle, and separate means for causing the discharge of said crop rearwardly from said riddle, said last-mentioned means being automatically operable at predetermined points in the travel of said attachment, both said means being operable by the wheels of said mower.

4. An attachment for mowing machines, including a removable seed pan, and a forwardly inclined riddle extending over said pan, having forward and rearward surfaces of different pitch.

5. An attachment for mowing machines, including a removable seed pan, and a forwardly inclined riddle extending over said pan, having forward and rearward surfaces of different pitch, the forward surface being flat.

6. An attachment for mowing machines, including a removable seed pan, and a forwardly inclined riddle extending over said pan, having forward and rearward surfaces of different pitch, the forward surface being flat and the rearward surface having ridges therein.

RITCHARD W. GEORGE.